(12) United States Patent
Kalb et al.

(10) Patent No.: US 8,041,530 B2
(45) Date of Patent: Oct. 18, 2011

(54) METHOD TO EFFICIENTLY SYNCHRONIZE MULTIPLE MEASUREMENTS ACROSS MULTIPLE SENSOR INPUTS

(75) Inventors: Thomas Franklin Kalb, Gardnerville, NV (US); Nathan Andrew Weller, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 12/259,715

(22) Filed: Oct. 28, 2008

(65) Prior Publication Data

US 2010/0106449 A1  Apr. 29, 2010

(51) Int. Cl.
 *G01R 27/28* (2006.01)
(52) U.S. Cl. ...................................................... 702/118
(58) Field of Classification Search .................... 702/118
 See application file for complete search history.

(56) References Cited

U.S. PATENT DOCUMENTS 5,965,819 A  10/1999  Piety et al.
7,031,063 B2 *  4/2006  Peterson et al. .............. 359/618

\* cited by examiner

*Primary Examiner* — Drew A Dunn
*Assistant Examiner* — Stephen Cherry
(74) *Attorney, Agent, or Firm* — Cantor Colburn LLP

(57) ABSTRACT

A system for synchronizing multiple measurements across multiple sensors is provided. The system implements an algorithm in combination with highly flexible hardware architecture that generally comprises of multiple sensor inputs correspondingly from multiple sensors, and multiple analog signal conditioning circuits, and an array of switches situated between the sensor inputs and the analog signal conditioning circuits that enable the multiple sensor inputs to be routed to any one of the analog signal conditioning circuits or to any combination of analog signal conditioning circuits simultaneously. The algorithm looks at all configured measurements for all configured sensors to determine which measurements should be performed in parallel. Any measurements that are in common among enabled sensors are performed simultaneously while other measurements consume analog signal conditioning paths as they are available.

15 Claims, 3 Drawing Sheets

FIG. 2

| Measurements Types | Sensor 1 Measurements | Sensor 2 Measurements | Sensor 3 Measurements | Sensor 4 Measurements |
|---|---|---|---|---|
| 1 | x | x | | |
| 2 | x | x | | |
| 3 | x | x | | |
| 4 | x | | x | x |
| 5 | | | x | |
| 6 | | x | | |
| 7 | | | x | x |

FIG. 3

| Measurement Order | Analog Signal Conditioning Circuit A | Analog Signal Conditioning Circuit B | Analog Signal Conditioning Circuit C | Analog Signal Conditioning Circuit D |
|---|---|---|---|---|
| First set of measurements performed. | Sensor 1, Measurement 1 | Sensor 2, Measurement 1 | Sensor 3, Measurement 1 | Sensor 4, Measurement 1 |
| Second set of measurements performed. | Sensor 1, Measurement 3 | Sensor 2, Measurement 3 | Sensor 4, Measurement 3 | Sensor 1, Measurement 5 |
| Third set of measurements performed. | Sensor 1, Measurement 2 | Sensor 2, Measurement 2 | Sensor 1, Measurement 4 | Sensor 3, Measurement 4 |
| Last set of measurements performed. | Sensor 3, Measurement 7 | Sensor 4, Measurement 7 | Sensor 2, Measurement 6 | Not used. |

METHOD TO EFFICIENTLY SYNCHRONIZE MULTIPLE MEASUREMENTS ACROSS MULTIPLE SENSOR INPUTS

BACKGROUND OF THE INVENTION

This invention relates generally to a data collection system and specifically to a method to efficiently synchronize multiple measurements across multiple sensor inputs.

Vibration and temperature measurements on machinery such as pumps, compressors, and motors can provide valuable information on the condition of the machinery and can help in estimating how long the machinery can run before overhaul or replacement is necessary. But for many small machines, the expense of permanently mounted vibration monitoring equipment cannot be justified. For some of these machines the use of a portable data collector to take periodic measurements is preferable to running the machine completely unmonitored. To justify the expense of having a technician walk around with the portable data collector and take periodic measurements, the measurement duration per machine must be minimized as much as possible.

Since there are many types of machines that each have different failure modes, the challenge is to design a portable data collector that is flexible and efficient in order to take a number of different measurements.

Accordingly, it is desirable to be able to take data from multiple sensors simultaneously, making multiple measurements simultaneously, and being able to handle a variety of different measurement types. If a particular machine requires fewer sensor input channels, designing a portable data collector to utilize the unused channel's circuitry to take more measurements simultaneously can lead to reduced overall measurement time per machine.

BRIEF DESCRIPTION OF THE INVENTION

In one embodiment, a method for synchronizing multiple measurements across multiple sensors is provided. The method includes selecting a first measurement from a list of measurement types; routing one or more of a plurality of input signals respectively from one or more of a plurality of sensors correspondingly to one or more of a plurality of signal conditioning circuits to enable the performance of the first measurement; determining if any of the plurality of signal conditioning circuits are available to perform a second measurement from the list of measurement types; selecting a second measurement from the list of measurement types when one or more of the plurality of signal conditioning circuits are available and enough signal conditioning circuits remain to perform the second measurement; and routing one or more of the plurality of input signals respectively from one or more of the plurality of sensors respectively to one or more of the plurality of signal conditioning circuits available to enable the performance of the second measurement, wherein the first measurement and the second measurement are performed simultaneously in parallel when no additional signal conditioning circuits remain to perform another measurement.

In another embodiment, a method for synchronizing multiple measurements across multiple sensors is provided. The method includes selecting a first measurement from a list of measurement types; routing one or more of a plurality of input signals respectively from one or more of the plurality of sensors correspondingly to one or more of a plurality of signal conditioning circuits to enable the performance of the first measurement; determining if any of the plurality of signal conditioning circuits are available to perform a second measurement from the list of measurement types; selecting a second measurement from the list of measurement types when one or more of the plurality of signal conditioning circuits are available and enough signal conditioning circuits remain to perform the second measurement; and routing one or more of the plurality of input signals respectively from one or more of the plurality of sensors respectively to one or more of the plurality of signal conditioning circuits available to enable the performance of the second measurement, wherein the first measurement and the second measurement are performed simultaneously in parallel when no additional signal conditioning circuits remain to perform another measurement; wherein each of the plurality of signal conditioning circuits outputs a conditioned signal that is fed into an analog to digital converter, a digital output signal from the analog to digital converter for each of the plurality of signal conditioning circuits is fed into a processing device.

In yet another embodiment, a system for synchronizing multiple measurements across multiple sensors is provided. The system includes a plurality of sensors designed to enable the performance of one or more measurements of a list of measurement types that need to be performed; a plurality of signal conditioning circuits in signal communication with each of the plurality of sensors, one or more of the plurality of signal conditioning circuits configured to correspondingly receive one or more of a plurality of input signals respectively from one or more of the plurality of sensors to perform a first measurement from the list of measurement types; and a processing device in signal communication with the plurality of signal conditioning circuits, the processing device includes an algorithm for determining if any of the plurality of signal conditioning circuits are available to perform a second measurement from the list of measurement types and selecting a second measurement from the list of measurement types when one or more of the plurality of signal conditioning circuits are available and enough signal conditioning circuits remain to perform the second measurement; wherein the processing device routes one or more of the plurality of input signals respectively from one or more of the plurality of sensors respectively to one or more of the plurality of signal conditioning circuits available in the system to enable the performance of the second measurement, the first measurement and the second measurement are performed simultaneously in parallel when no additional signal conditioning circuits remain to perform another measurement.

In another embodiment, a system for synchronizing multiple measurements across multiple sensors is provided. The system includes a plurality of sensors designed to enable the performance of one or more measurements of a list of measurement types that need to be performed; a plurality of signal conditioning circuits in signal communication with each of the plurality of sensors, one or more of the plurality of signal conditioning circuits configured to correspondingly receive one or more of a plurality of input signals respectively from one or more of the plurality of sensors to perform a first measurement from the list of measurement types; at least one or more switches configured to route the plurality of input signals respectively from one or more of the plurality of sensors respectively to one or more of the plurality of signal conditioning circuits to perform the first measurement and the second measurement; and a processing device in signal communication with the plurality of signal conditioning circuits, the processing device includes an algorithm for determining if any of the plurality of signal conditioning circuits are available to perform a second measurement from the list of measurement types and selecting a second measurement from the list of measurement types when one or more of the plurality of signal conditioning circuits are available and enough signal conditioning circuits remain to perform the second measurement; wherein the processing device utilizes the at least one or more switches to route one or more of the plurality of input signals respectively from one or more of the plurality of sensors respectively to one or more of the plurality of signal conditioning circuits available in the system to enable the performance of the second measurement, the first measurement and the second measurement are performed simultaneously in parallel when no additional signal conditioning circuits remain to perform another measurement.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and features, and advantages of the invention are apparent from the following detailed description taken in conjunction with the accompanying drawings in which:

FIG. 2 is an exemplary table of a plurality of sensors being configured to take different measurements from a list of measurement types in accordance with one exemplary embodiment of the present invention;

FIG. 3 is an exemplary table of illustrating how a plurality of signal conditioning circuits can be used to perform all the measurements on the plurality of sensors shown in the table in FIG. 2 in accordance with one exemplary embodiment of the present invention.

The detailed description explains embodiments of the invention, together with advantages and features, by way of example with reference to the drawings.

DETAILED DESCRIPTION OF THE INVENTION

Exemplary embodiments are directed to a system and method for synchronizing multiple measurements across multiple sensors. Further, in these embodiments, the system implements an algorithm in combination with highly flexible hardware architecture that generally comprises of multiple sensor inputs correspondingly from multiple sensors, and multiple analog signal conditioning circuits, and an array of switches situated between the sensor inputs and the analog signal conditioning circuits that enable the multiple sensor inputs to be routed to any one of the analog signal conditioning circuits or to any combination of analog signal conditioning circuits simultaneously. This allows the analog signal conditioning circuits to be used independently to perform measurements in parallel. In exemplary embodiments, the algorithm looks at all configured measurements for all configured sensors to determine which measurements should be performed in parallel. Any measurements that are in common among enabled sensors are performed simultaneously while other measurements consume analog signal conditioning paths as they are available.

Figure 1:
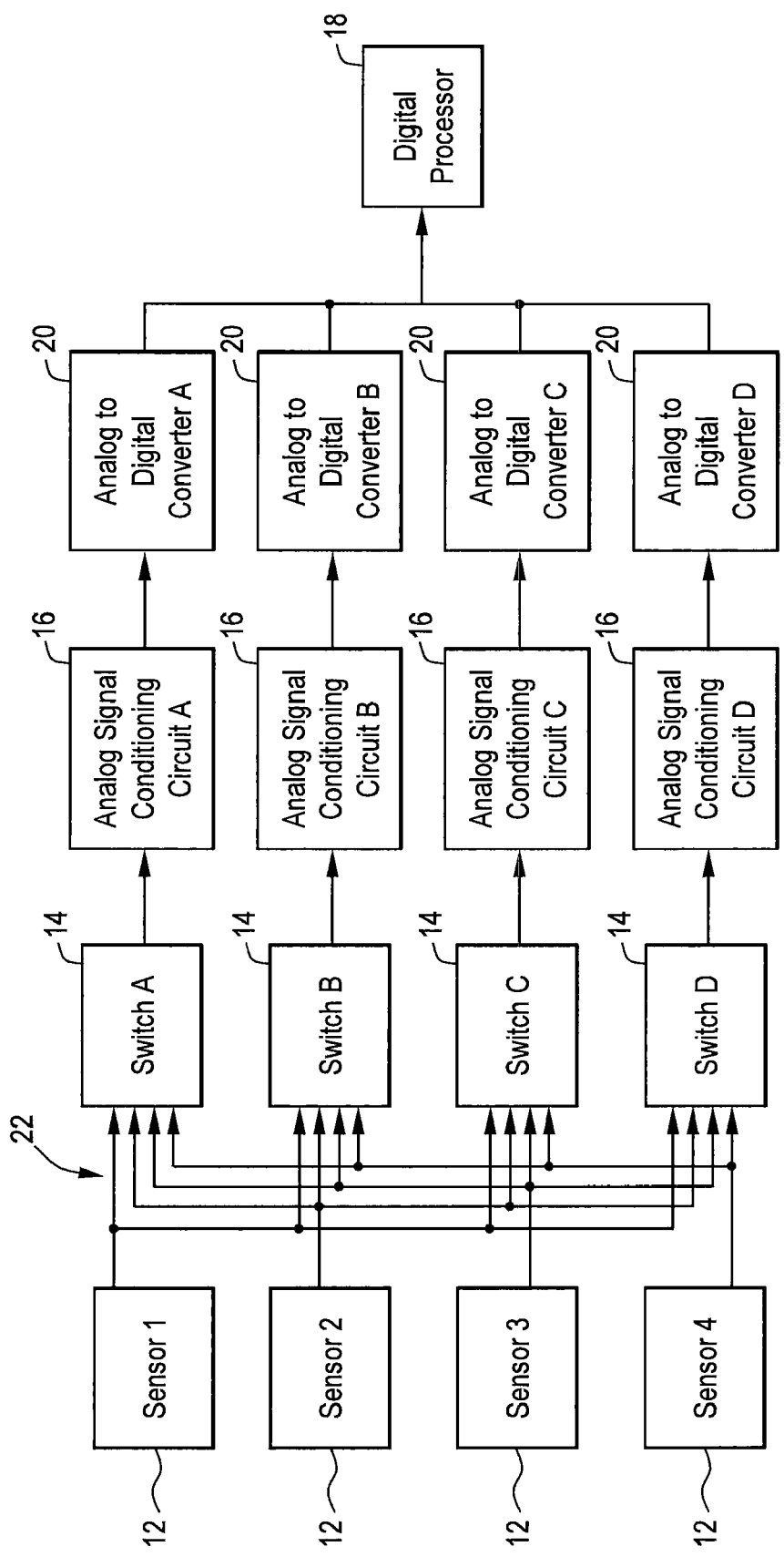
FIG. 1 is a schematic of a system that implements an algorithm for synchronizing a large number of measurements across multiple sensor inputs in accordance with one exemplary embodiment of the present invention.

Referring to the drawings, FIG. 1 is a simplified schematic illustrating the basic elements of a data collecting system 10 for efficiently synchronizing a large number of measurements across multiple sensor inputs in accordance with one exemplary embodiment of the present invention. The system 10 includes a plurality of sensors 12, one or more switches 14, a plurality of signal conditioning circuits 16, a processing device 18, and a plurality of analog to digital converters 20 between the plurality of conditioning circuits 16 and the processing device 18.

In accordance with one embodiment, each of the plurality of sensors 12 is selectively coupled to each of the plurality of signal conditioning circuits 16 through the operations of the one or more switches 14. In other words, the one or more switches 14 situated between the plurality of sensors 12 and the plurality of signal conditioning circuits 16 enable the sensor input signals correspondingly from the plurality of sensors 12 to be routed to one or more of the plurality of signal conditioning circuits 16 for the performance of one or more measurement types. The sensor input signals are depicted as signal lines 22.

In accordance with one non-limiting exemplary embodiment, each of the plurality of sensors 12 can be any one of many different types of detecting devices (e.g., vibration transducer; accelerometer, velocity transducer, or otherwise) for which the signal conditioning circuits are configured for enabling the performance of at least one of many different measurement types (e.g., non-integration, integration, enveloping, DC coupling, AC coupling, band-pass filtering, etc.). In one embodiment, each of the plurality of sensors 12 is different from the other. Of course, each of the plurality of sensors 12 can be one of many different types of sensors and can be similar to another one or more of the types being used in the system 10 in accordance with other exemplary embodiments. FIG. 1 illustrates four sensors 12 that enable the performance of many types of measurements. However, it should be understood that any number of sensors can be used to enable the performance of various measurement types depending on the application as long as the number of sensors does not exceed the number of signal conditioning circuits 16 available in the system 10. The number of sensors, signal conditioning circuits, and measurement types should not be restricted to the examples set forth herein, except the number of signal conditioning circuits should be greater than or equal to the number of sensors to handle the case where each sensor requires the same measurement type and therefore all sensors must be measured simultaneously. In a case where the same measurement need not be taken on all the sensors simultaneously, the limitation would be that a particular measurement can only be taken at one time on the number of sensor inputs 12 corresponding to the number of signal conditioning channels 16, allowing there to be more sensor inputs 12 than signal conditioning channels 16.

In accordance with one embodiment, the one or more switches 14 are configured to route the sensor input signal 22 of each of the plurality of sensors 12 to one or more of the plurality of signal conditioning circuits 16. In one embodiment, each of the one or more switches 14 is a single-pole, multiple-throw switch configured to route any of the sensor input signals 22 correspondingly from the plurality of sensors 12 to one or more of the signal conditioning circuits 16 under the control of the processing device 18 in accordance with one non-limiting exemplary embodiment. In another embodiment, a separate microprocessor (not shown) controls the operations or the switch routing of the switches based on the measurement types that need to be performed. FIG. 1 illustrates four switches associated with each of the plurality of signal conditioning circuits 16 for routing any of the sensor input signals 22 correspondingly from the plurality of sensors 14 to one or more of the signal conditioning circuits 16. However, it should be understood that any number of switches can be associated with each or one or more of the plurality of signal conditioning circuits 16 depending on the application and should not be limited to the configuration as shown.

Each of the plurality of signal conditioning circuits 16 is configured to receive a sensor input signal 22 from one of the plurality of sensors 12 for conditioning and sampling the sensor input signal 22 to produce a conditioned signal. Each of the plurality of signal conditioning circuits 16 is configured to perform different measurement types under the control of the processing device 18 or a separate processor. Each of the plurality of signal conditioning circuits 16 can be any conventional conditioning circuit for performing one of many different measurement types. In accordance with one exemplary embodiment, two or more of the plurality of signal conditioning circuits 16 are simultaneously operating or performing measurements in parallel, which effectively speeds up data acquisition. In one embodiment, each of the plurality of signal conditioning circuits 16 being routed a sensor input signal operably perform measurements in parallel.

In accordance with one exemplary embodiment, the plurality of analog to digital converters 20 is configured for correspondingly receiving the conditioned signals from the plurality of signal conditioning circuits 16. The plurality of analog to digital converters 20 are further configured for converting the conditioned signals to digital signals, which are each fed into the processing device 18 for further processing in accordance with one non-limiting exemplary embodiment. Of course, the outputs from the analog to digital converters 20 can be fed into separate processors in accordance with other exemplary embodiments. It is contemplated that the plurality of analog to digital converters 20 are correspondingly an integral part of the signal conditioning circuits 16. It should be understood that the number of analog to digital converters can vary depending on the application and should not be limited to the configuration as shown. For example, a single analog to digital converter can be used to convert analog data to digital data.

The processing device 18 can be any conventional processor such as a field-programmable gate array (FPGA), digital signal processor (DSP), or general purpose microprocessor suitable for receiving digital data from the plurality of analog to digital converters 20 and processing the same. The processing device 18 configures the analog to digital converters to sample the sensor input signals at different sampling rates in accordance with one exemplary embodiment. The processing device 18 is further configured to control the operations of the system 10. However, it is contemplated that another processor is used separate from or in conjunction with processing device 18 for handling the operations of the one or more switches 14.

Figure 4:
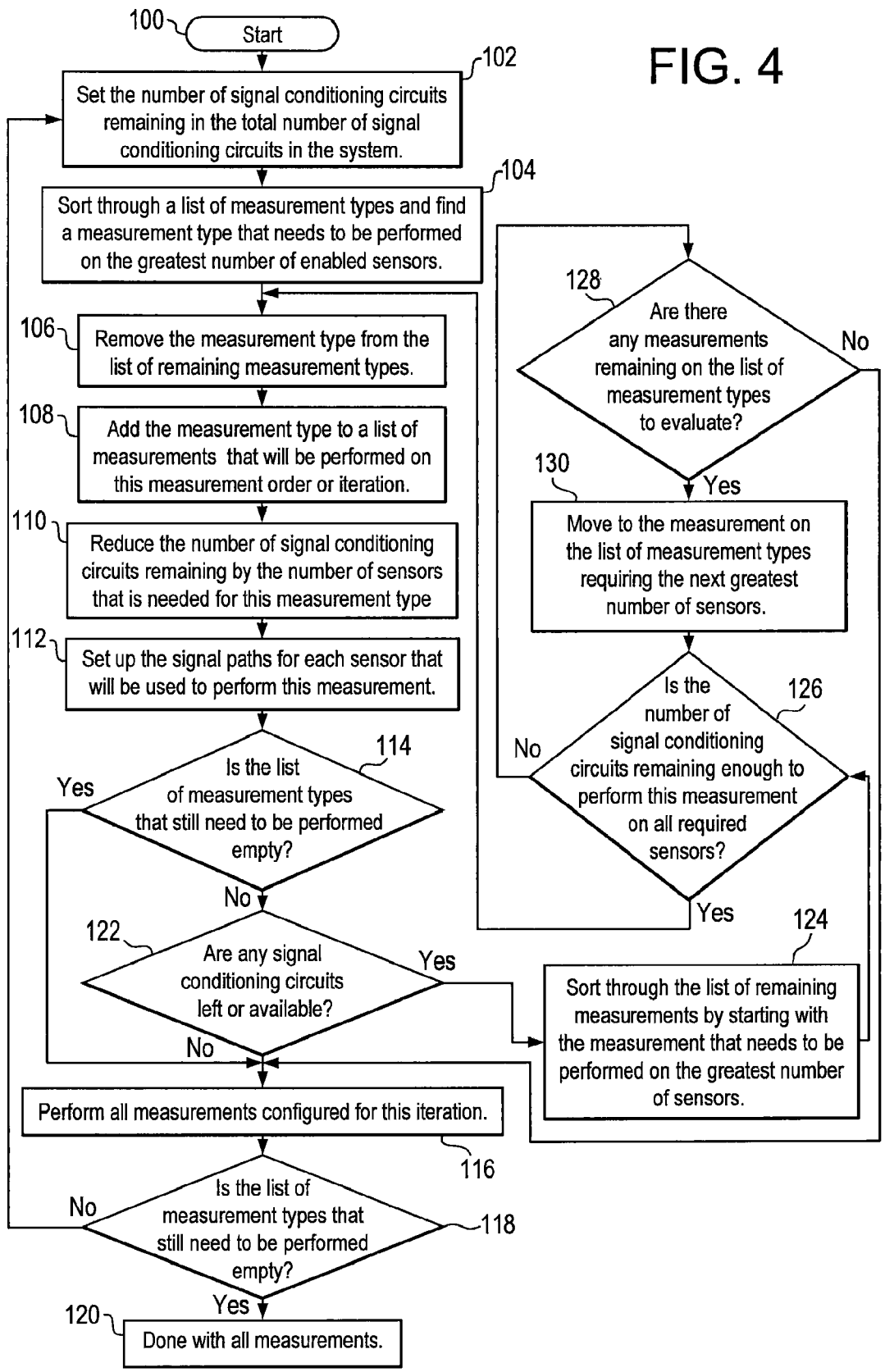
FIG. 4 is a flowchart of a method for synchronizing a large number of measurements across multiple sensor inputs in accordance with one exemplary embodiment of the present invention.

In accordance with one exemplary embodiment, the processing device 18 implements an algorithm, such as that shown in FIG. 4 and described below, in combination with the highly flexible hardware architecture described above to determine which measurement types should be performed in parallel. Such algorithm determines which measurements in a list of measurement types should be performed in parallel by the plurality of signal conditioning circuits 16. In operation, the algorithm selects a first measurement that is common among the greatest number of enabled sensors to be performed by the plurality of signal conditioning circuits 16 available in the system. If in the first measurement order, one or more of the plurality of signal conditioning circuits are available, another measurement from the list of measurement types is selected to be performed by the available signal conditioning circuit(s) simultaneously with the first selected measurement. A second measurement selected should be common among the next greatest number of enabled sensors. If not enough signal conditioning circuits are available to accommodate the second measurement, then another measurement common among the next greatest number of enabled sensors is selected. The first measurement order is performed when no additional signal conditioning circuits are available or no other measurement can be performed in the first measurement order. This method of synchronizing a number of measurements across multiple sensors inputs will be described in more detail by way of example below.

Now referring to FIG. 2, an exemplary table is shown to better illustrate the algorithm described above by way of example. In this example, four sensors are configured to enable the performance of different measurement types that need to be performed. Some of the measurement types are common across multiple sensors. For example, measurement type 1 must be performed on all four sensors available.

FIG. 3 is an exemplary table illustrating how four signal conditioning circuits can be used to perform measurements on all enabled sensors shown in the exemplary table in FIG. 2. This table shows all fifteen measurements with seven measurement types being performed in four efficient measurement orders or iterations. This table is realized using the above algorithm, which is implemented by the digital processor 18 in accordance with one embodiment.

Now referring to FIG. 4, a method for synchronizing a large number of measurements across multiple sensor inputs in accordance with one exemplary embodiment will now be discussed.

At step 100, begin operation.

At step 102, set the number of signal conditioning circuits remaining in the total number of signal conditioning circuits in the system 10. In the example illustrated in FIGS. 2 and 3, the number of signal conditioning circuits remaining in the total number of signal conditioning circuits in the system 10 when operation begins is four.

At step 104, sort through a list of measurement types and find a measurement type that needs to be performed on the greatest number of enabled sensors. In the same example illustrated in FIGS. 2 and 3, the measurement type that needs to be performed on the greatest number of enabled sensors is measurement type #1.

At step 106, remove the measurement type from the list of remaining measurement types. Using the same example illustrated in FIGS. 2 and 3, measurement type #1 would be removed from the list.

At step 108, add the measurement type to a list of measurements that will be performed on this measurement order or iteration. Using the same example illustrated in FIGS. 2 and 3, measurement type #1 would be performed on the first measurement order.

At step 110, reduce the number of signal conditioning circuits remaining by the number of sensors that is needed for this measurement type. In the same example illustrated in FIGS. 2 and 3, since there are four signal conditioning circuits and four sensors are being used to enable the performance of measurement type #1, then there would be no more signal conditioning circuits available.

At step 112, set up the signal paths for each sensor that will be used to perform this measurement. This is accomplished by routing the sensor input signals 22 from each of the plurality of sensors 12 that will be used to perform this measurement to one or more of the plurality of signal conditioning circuits 16 utilizing one or more of the switches 14. Continuing with the same example, the sensor input signal from sensor #1 is routed to signal conditioning circuit A through switch A; the sensor input signal from sensor #2 is routed to signal conditioning circuit B through switch B; and so forth.

At step 114, determine if the list of measurement types that still need to be performed is empty. Continuing with the same example, the answer would be no.

However, if the answer to step 114 is yes, then perform all measurements configured for this iteration at step 116.

After step 116, determine if the list of measurement types that still need to be performed is empty at step 118. If the answer is yes, conclude that all measurements are done at step 120. If the answer is no, proceed back to step 102.

When the answer to step 114 is no, determine if there are any signal conditioning circuits left or available at step 122.

If the answer to step 122 is no, then proceed to step 116. If the answer is yes, then sort through the list of remaining measurements by starting with the measurement that needs to be performed on the greatest number of sensors 124.

At step 126, determine if the number of signal conditioning circuits remaining is enough to perform this measurement on all required sensors. If the answer to step 126 is yes, than proceed to step 106. Using the same example above, at the second measurement order there would be one available signal conditioning circuit to perform measurement type #5, which only requires one sensor to enable the performance of such measurement. Thus, measurement type #5 would be included in the second measurement order along with measurement type #3.

However, if the answer to step 126 is no, then determine if there are any measurements remaining on the list of measurement types to evaluate at step 128. If the answer to step 128 is yes, move to the measurement on the list of measurement types requiring the next greatest number of sensors at step 130. Otherwise, if the answer to step 128 is no, proceed to step 116.

The steps above are performed until all the measurements on the list of measurement types are completed. Using the steps described above, all the measurements can be performed in three efficient measurement orders.

The exemplary systems and methods described above enable a user to associate multiple measurements across multiple sensor inputs, which effectively speeds up measurements by utilizing multiple signal conditioning circuits when possible.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for synchronizing multiple measurements across multiple sensors, comprising:
   - selecting a first measurement from a list of measurement types;
   - routing one or more of a plurality of input signals respectively from one or more of a plurality of sensors correspondingly to one or more of a plurality of signal conditioning circuits to enable the performance of the first measurement;
   - determining if any of the plurality of signal conditioning circuits are available to perform a second measurement from the list of measurement types;
   - selecting a second measurement from the list of measurement types when one or more of the plurality of signal conditioning circuits are available and enough signal conditioning circuits remain to perform the second measurement; and
   - routing one or more of the plurality of input signals respectively from one or more of the plurality of sensors respectively to one or more of the plurality of signal conditioning circuits available to enable the performance of the second measurement, wherein the first measurement and the second measurement are performed simultaneously in parallel when no additional signal conditioning circuits remain to perform another measurement.

2. The method of claim 1, wherein the first measurement selected is common among the greatest number of the plurality of sensors and the second measurement selected is common among the next greatest number of the plurality of sensors.

3. The method of claim 1, wherein each of the plurality of signal conditioning circuits outputs a conditioned signal.

4. The method of claim 3, wherein the conditioned signal from each of the plurality of signal conditioning circuits is fed into a processing device.

5. The method of claim 3, wherein the conditioned signal from each of the plurality of signal conditioning circuits is fed into an analog to digital converter.

6. The method of claim 5, wherein a digital output signal from the analog to digital converter for each of the plurality of signal conditioning circuits is fed into a digital processor.

7. The method of claim 1, wherein one or more switches are configured to route the plurality of input signals respectively from one or more of the plurality of sensors to one or more of the plurality of signal conditioning circuits to perform the first measurement and the second measurement.

8. The method of claim 7, wherein the switch operations of the one or more switches are controlled by a digital processor.

9. A system for synchronizing multiple measurements across multiple sensors, comprising:
   - a plurality of sensors designed to enable the performance of one or more measurements of a list of measurement types that need to be performed;
   - a plurality of signal conditioning circuits in signal communication with each of the plurality of sensors, one or more of the plurality of signal conditioning circuits configured to correspondingly receive one or more of a plurality of input signals respectively from one or more of the plurality of sensors to perform a first measurement from the list of measurement types; and
   - a processing device in signal communication with the plurality of signal conditioning circuits, the processing device includes an algorithm for determining if any of the plurality of signal conditioning circuits are available to perform a second measurement from the list of measurement types and selecting a second measurement from the list of measurement types when one or more of the plurality of signal conditioning circuits are available and enough signal conditioning circuits remain to perform the second measurement;
   - wherein the processing device routes one or more of the plurality of input signals respectively from one or more of the plurality of sensors respectively to one or more of the plurality of signal conditioning circuits available in the system to enable the performance of the second measurement, the first measurement and the second measurement are performed simultaneously in parallel when no additional signal conditioning circuits remain to perform another measurement.

10. The system of claim 9, wherein the first measurement selected is common among the greatest number of the plurality of sensors and the second measurement selected is common among the next greatest number of the plurality of sensors.

11. The system of claim 9, further comprising one or more switches configured to route the plurality of input signals respectively from one or more of the plurality of sensors respectively to one or more of the plurality of signal conditioning circuits to perform the first measurement and the second measurement.

12. The system of claim 11, wherein the switch operations of the one or more switches are controlled by a digital processor.

13. The system of claim 9, wherein the processing device is a digital processor.

14. A system for synchronizing multiple measurements across multiple sensors, comprising:
a plurality of sensors designed to enable the performance of one or more measurements of a list of measurement types that need to be performed;
a plurality of signal conditioning circuits in signal communication with each of the plurality of sensors, one or more of the plurality of signal conditioning circuits configured to correspondingly receive one or more of a plurality of input signals respectively from one or more of the plurality of sensors to perform a first measurement from the list of measurement types;
at least one or more switches configured to route the plurality of input signals respectively from one or more of the plurality of sensors respectively to one or more of the plurality of signal conditioning circuits to perform the first measurement and the second measurement; and
a processing device in signal communication with the plurality of signal conditioning circuits, the processing device includes an algorithm for determining if any of the plurality of signal conditioning circuits are available to perform a second measurement from the list of measurement types and selecting a second measurement from the list of measurement types when one or more of the plurality of signal conditioning circuits are available and enough signal conditioning circuits remain to perform the second measurement;
wherein the processing device utilizes the at least one or more switches to route one or more of the plurality of input signals respectively from one or more of the plurality of sensors respectively to one or more of the plurality of signal conditioning circuits available in the system to enable the performance of the second measurement, the first measurement and the second measurement are performed simultaneously in parallel when no additional signal conditioning circuits remain to perform another measurement.

15. The system of claim 14, wherein the first measurement selected is common among the greatest number of the plurality of sensors and the second measurement selected is common among the next greatest number of the plurality of sensors.

* * * * *